US011822767B1

(12) United States Patent
Potter et al.

(10) Patent No.: US 11,822,767 B1
(45) Date of Patent: Nov. 21, 2023

(54) DISPLAY TOOL

(71) Applicant: The Prudential Insurance Company of America, Newark, NJ (US)

(72) Inventors: Christopher Brian Potter, Mooresville, NC (US); Katie Peatrowsky, Saint Michael, MN (US); Linda Julian, Roseland, NJ (US); David Nothnagel, Flemington, NJ (US); Trevor Jones, St. Louis, MO (US); Caroline Frances Stephani, Minneapolis, MN (US); Jeffrey Lee Dennie, Champlin, MN (US)

(73) Assignee: THE PRUDENTIAL INSURANCE COMPANY OF AMERICA, Newark, NJ (US)

( * ) Notice: Subject to any disclaimer, the term of this patent is extended or adjusted under 35 U.S.C. 154(b) by 0 days.

(21) Appl. No.: 18/182,791

(22) Filed: Mar. 13, 2023

(51) Int. Cl.
*G06F 3/0482* (2013.01)
*G06Q 40/08* (2012.01)
*G06T 11/20* (2006.01)

(52) U.S. Cl.
CPC ........... *G06F 3/0482* (2013.01); *G06Q 40/08* (2013.01); *G06T 11/206* (2013.01); *G06T 2200/24* (2013.01)

(58) Field of Classification Search
CPC .......................... G06F 3/048–05; G06Q 40/08
See application file for complete search history.

(56) References Cited

U.S. PATENT DOCUMENTS

| | | | | |
|---|---|---|---|---|
| 5,956,691 | A * | 9/1999 | Powers | G06Q 40/08 705/4 |
| 11,113,770 | B1 * | 9/2021 | Magoon | G06Q 30/0203 |
| 11,176,616 | B2 * | 11/2021 | Coonrod | G06Q 40/08 |
| 2002/0152098 | A1 * | 10/2002 | Evans | G06Q 40/08 705/4 |
| 2007/0219847 | A1 * | 9/2007 | Ogonowski | G06Q 40/08 715/212 |

(Continued)

OTHER PUBLICATIONS

Prudential Life Essentials; Mar. 14, 2022; https://img04.en25.com/Web/PrudentialB2B/%7B8c859a77-d4af-4a1b-ac59-b8f0aab15417%7D_LifeInsight_Term_Conversion_Feature_%E2%80%93_ADA.pdf; 1 page.

(Continued)

*Primary Examiner* — Daniel Rodriguez
(74) *Attorney, Agent, or Firm* — BAKER BOTTS L.L.P.

(57) ABSTRACT

An apparatus includes a display, a memory, and a processor. The memory stores events and available conversion options for a policy. The events include a conversion expiration event occurring on a conversion expiration date. Each conversion option is associated with a new policy type into which the policy is convertible prior to occurrence of the conversion expiration event. The processor presents a first page of a GUI, displaying a timeline of the events. The first page also displays a feature selectable to investigate the available conversion options. In response to receiving information associated with a selection of the feature, the processor presents a second page of the GUI, displaying the conversion options. The processor receives information associated with a selection of a first conversion option, and, in response, displays a graph illustrating the behavior of the policy upon conversion to the new policy type associated with the first conversion option.

20 Claims, 7 Drawing Sheets

(56) References Cited

U.S. PATENT DOCUMENTS

| | | | | |
|---|---|---|---|---|
| 2009/0089101 A1* | 4/2009 | Hashim | G06Q 40/08 715/745 |
| 2009/0281840 A1* | 11/2009 | Hersch | G06Q 40/00 705/4 |
| 2012/0232932 A1* | 9/2012 | Voccola | G06Q 40/08 705/4 |
| 2014/0039934 A1* | 2/2014 | Rivera | G06Q 10/10 705/4 |
| 2016/0225092 A1* | 8/2016 | Le | G06Q 40/08 |
| 2017/0024827 A1* | 1/2017 | McGill | G06Q 40/08 |
| 2017/0206604 A1* | 7/2017 | Al-Masoud | G06Q 40/08 |
| 2017/0308958 A1* | 10/2017 | Rieth | G06Q 40/08 |
| 2020/0273112 A1* | 8/2020 | Errico | G06Q 50/163 |
| 2020/0302549 A1* | 9/2020 | Jordan, II | H04W 4/024 |

OTHER PUBLICATIONS

LifeInsight: Your new perspective on life; https://prudential.assetserv.com/prudential/download/file?assetId=8299223&external=true; 5 pages printed Dec. 7, 2022.

* cited by examiner

Comparative Values – Average Portfolio Allocation

Policy # V212xxxx
JUAN xxxx, Male, 33, Preferred Best
$250,000 PruLife® Custom Premier II
Type B (Variable) Death Benefit
Guideline Premium Test
Next Scheduled Monthly-EFT Premium: $155.00

Non-Guaranteed Results Based on Hypothetical Annual Gross Returns and Assumed Charges

| Year | Age | Annual Contract Outlay^ | Contract Fund | 8.92% (Net 8.00%) and Current Charges | | 8.92% (Net 7.63%) and Maximum Charges | | 6.92% (Net 6.00%) and Current Charges | | 6.92% (Net 5.63%) and Maximum Charges | | 0.00% (Net 1.29%) and Maximum Charges | |
|---|---|---|---|---|---|---|---|---|---|---|---|---|---|
| | | | | Net Cash Value | Net Death Benefit | Net Cash Value | Net Death Benefit | Net Cash Value | Net Death Benefit | Net Cash Value | Net Death Benefit | Net Cash Value | Net Death Benefit |
| Total | | | | | | | | | | | | | |
| Total | | | | | | | | | | | | | |

12/21/2018 12:23 PM Page 8 of 22

FIG. 2

DISPLAY TOOL

TECHNICAL FIELD

This disclosure relates generally to an improved graphical user interface.

BACKGROUND

In a variety of industries, it is standard practice for companies to provide information to their consumers and producers (agents who sell directly to consumers) in the form of multi-page documents. For example, customers commonly receive information about accounts, opportunities, and policies through such documents.

SUMMARY

According to an embodiment, an apparatus includes a display, a memory, and a hardware processor communicatively coupled to the memory. The memory includes information associated with a policy of a first type. The information associated with the policy includes a list of events associated with the policy, and an identification of one or more conversion options available for the policy. Each event of the list of events is assigned a date. The list of events includes a conversion expiration event occurring on a conversion expiration date. Each conversion option of the one or more conversion options is associated with a new policy type of a set of new policy types into which the policy is convertible prior to occurrence of the conversion expiration event. The hardware processor presents, on the display, a first page of a graphical user interface associated with the policy. The first page displays a timeline that includes a plurality of points. Each point of the plurality of points corresponds to an event of the list of events associated with the policy. The first page also displays a feature selectable by a user to investigate the one or more conversion options available for the policy. The hardware processor also receives information associated with a selection of the feature. In response to receiving the information associated with the selection of the feature, the hardware processor presents, on the display, a second page of the graphical user interface. The second page displays the one or more conversion options. Each conversion option is selectable by the user to investigate a behavior of the policy upon conversion of the policy from the first type to the new policy type associated with the conversion option. The hardware processor additionally receives information associated with a selection of a first conversion option of the one or more conversion options. In response to receiving the information associated with the selection of the first conversion option, the hardware processor displays, on the second page of the graphical user interface, a graph illustrating the behavior of the policy upon conversion from the first type to the new policy type associated with the first conversion option.

According to another embodiment, a method includes presenting, on a display, a first page of a graphical user interface associated with a policy. The first page displays a timeline that includes a plurality of points. Each point of the plurality of points corresponds to an event of a list of events associated with the policy. Each event of the list of events is assigned a date. The list of events includes a conversion expiration event occurring on a conversion expiration date. The first page also displays a feature selectable by a user to investigate one or more conversion options available for the policy. Each conversion option of the one or more conversion options is associated with a new policy type of a set of new policy types into which the policy is convertible prior to occurrence of the conversion expiration event. The method also includes receiving information associated with a selection of the feature. In response to receiving the information associated with the selection of the feature, the method includes presenting, on the display, a second page of the graphical user interface. The second page displays the one or more conversion options. Each conversion option is selectable by the user to investigate a behavior of the policy upon conversion of the policy from the first type to the new policy type associated with the conversion option. The method additionally includes receiving information associated with a selection of a first conversion option of the one or more conversion options. In response to receiving the information associated with the selection of the first conversion option, the method includes displaying, on the second page of the graphical user interface, a graph illustrating the behavior of the policy upon conversion from the first type to the new policy type associated with the first conversion option.

According to a further embodiment, a non-transitory computer-readable medium includes instructions that, when executed by a hardware processor, cause the hardware processor to present, on a display, a first page of a graphical user interface associated with a policy. The first page displays a timeline that includes a plurality of points. Each point of the plurality of points corresponds to an event of a list of events associated with the policy. Each event of the list of events is assigned a date. The list of events includes a conversion expiration event occurring on a conversion expiration date. The first page also displays a feature selectable by a user to investigate one or more conversion options available for the policy. Each conversion option of the one or more conversion options is associated with a new policy type of a set of new policy types into which the policy is convertible prior to occurrence of the conversion expiration event. The instructions, when executed by the hardware processor, further cause the processor to receive information associated with a selection of the feature. In response to receiving the information associated with the selection of the feature, the instructions, when executed by the hardware processor, further cause the processor to present, on the display, a second page of the graphical user interface. The second page displays the one or more conversion options. Each conversion option is selectable by the user to investigate a behavior of the policy upon conversion of the policy from the first type to the new policy type associated with the conversion option. The instructions, when executed by the hardware processor, additionally cause the processor to receive information associated with a selection of a first conversion option of the one or more conversion options. In response to receiving the information associated with the selection of the first conversion option, the instructions, when executed by the hardware processor, further cause the processor to display, on the second page of the graphical user interface, a graph illustrating the behavior of the policy upon conversion from the first type to the new policy type associated with the first conversion option.

Certain embodiments provide one or more technical advantages. For example, an embodiment enables policy producers to access all relevant information about an insurance policy they have sold using a single graphical user interface, rather than having to search through multiple documents and pages. As another example, an embodiment provides graphical representations of insurance policy illustrations that are easier to understand than the tables and lists of numbers that are traditionally used in the industry. As another example, an embodiment enables a user to efficiently investigate the expected behavior of policy upon conversion from a fixed term policy into one or more other policy types. In particular, certain embodiments enable a user to display multiple graphs on the same graphical user interface page, with each graph corresponding to a different policy into which a given fixed term policy may be converted. In this manner, certain embodiments enable a direct comparison of various policies into which the given fixed term policy may be converted. As a further example, an embodiment provides a policy producer with automatic notifications associated with the policies he/she has sold, enabling the producer to efficiently manage those policies, without requiring the producer to continually monitor the policies (thereby conserving the processing and network bandwidth resources associated with such continual monitoring). Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 2 provides an example of a traditional policy illustration;

DETAILED DESCRIPTION

Figure 1:
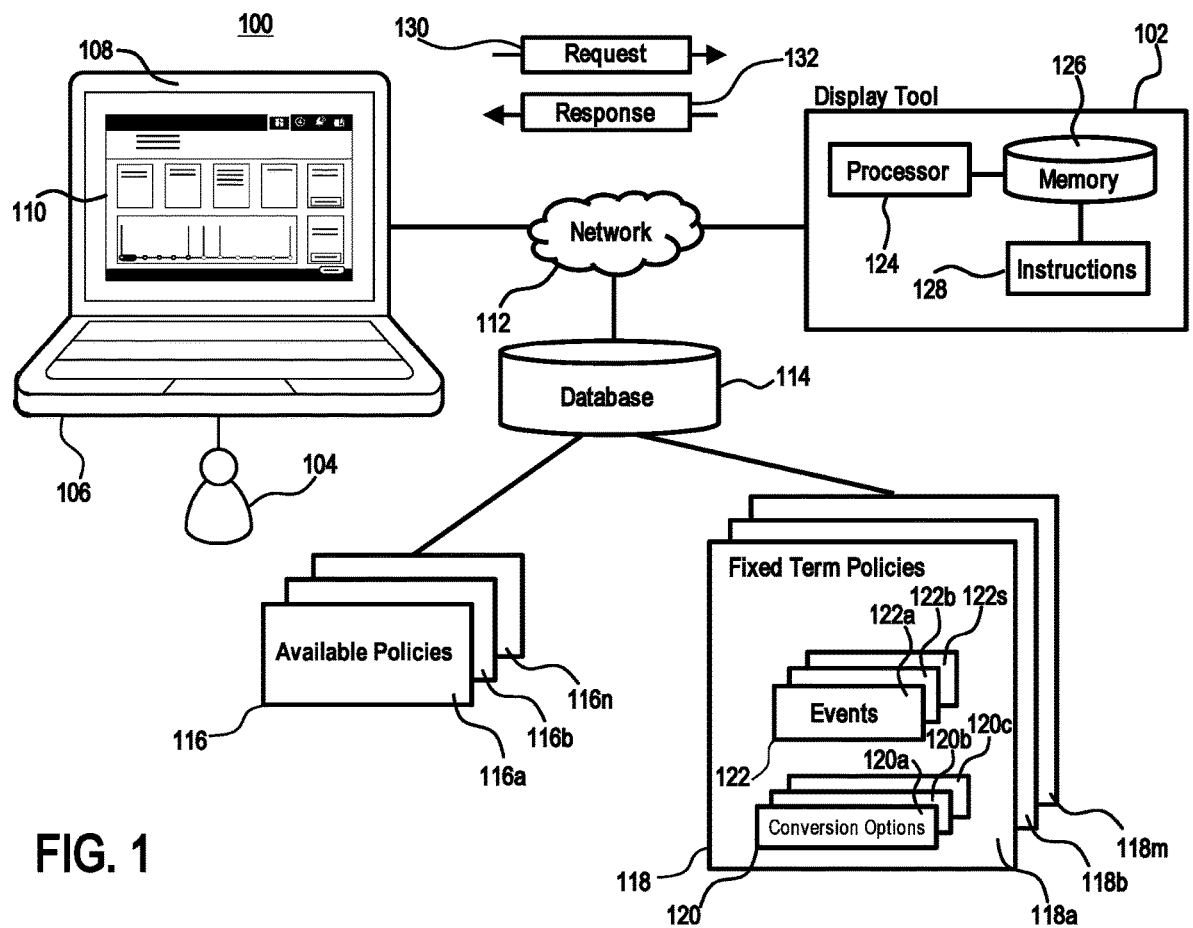
FIG. 1 illustrates an example system.

Embodiments of the present disclosure and its advantages are best understood by referring to FIGS. 1 through 5 of the drawings, like numerals being used for like and corresponding parts of the various drawings.

In a variety of industries, it is standard practice for companies to provide information to their consumers and producers (agents who sell directly to consumers) in the form of multi-page documents. For example, consumers commonly receive information about accounts, opportunities, and policies through such documents. With the explosion of the Internet and the use of personal computers, companies have also begun to provide consumers and producers electronic access to the information contained in such documents, by developing graphical user interfaces through which the consumers and producers can view such information. However, such graphical user interfaces tend to be quite complex, given the large volume of data to which they provide access. Given the limited display area of a typical computer monitor, such graphical user interfaces are generally unable to present all the data contained in traditional multi-page documents to a user on a single display page. As a result, such graphical user interfaces frequently contain a large number of menus and linked pages that users may find difficult to navigate through. For example, if accessing a particular piece of information first requires a user to click through two menus and six links, the user may simply avoid accessing this information.

As discussed above, such issues exist in a variety of industries in which graphical user interfaces are used to present information traditionally contained in multi-page documents to producers and/or consumers. As a specific example, in the life insurance industry, companies traditionally provide information about their policies to consumers and producers in the form of illustrations. Such illustrations typically provide information about the performance of the associated policies over time (e.g., historical performance, expected performance, etc.). Such illustrations are often quite long (e.g., 20 to 30 pages in length), and are typically filled with a large quantity of numbers and disclosures. Currently available graphical user interfaces are typically unable to display this information in an easy-to-understand format, making it difficult for producers to actively monitor the policies they have sold to consumers. This can lead to a variety of issues. For example, a producer may be unaware of upcoming events that may impact a consumer's policy (e.g., the expiry of a time period during which the consumer may convert a fixed term policy into another policy type). Without such knowledge, the producer may be unable to counsel the policy owner about the effect of such actions in a sufficient time to enable the consumer to take appropriate action.

This disclosure contemplates a display tool that addresses one or more of the above issues. This tool provides an improved graphical user interface for use in a variety of industries, through which a user can access a given piece of information provided by the graphical user interface directly from the main page of the interface (either by viewing the information directly on the main page of the graphical user interface, by following a single link, of a set of such links displayed on the main page, to the particular information, or by expanding an additional section of the interface, display on the main page).

While this disclosure contemplates the use of the display tool in any industry, for ease of explanation and understanding, but not by way of limitation, this disclosure describes the tool as implemented for the life insurance industry. Such an implementation simplifies the process by which life insurance policy producers monitor the policies they have sold; rather than requiring producers to search through multiple complex documents stored at a variety of locations, accessible only by clicking through multiple links, the display tool provides a producer with a variety of types of information the producer may want to know about a given policy directly from the main page of the graphical user interface for that particular policy. For example, in certain embodiments, the tool accesses information about a fixed term policy that is stored in a database and then uses this information to display an easy-to-understand summary of the policy, along with a timeline of events associated with the policy (e.g., expiration of a conversion option period, expiration of a level premium payment period, etc.), thereby providing a policy producer with an easy to understand, graphical representation of the policy. As another example, in certain embodiments, the tool enables a user to easily and efficiently compare available conversion options for the policy, by displaying expected behaviors of the policy, in response to various conversions of the policy from a fixed term policy into one or more policies of other types, next to one another on a graphical user interface. Furthermore, certain embodiments of the tool enable a user to adjust one or more parameters associated with the various conversion options, to investigate, in real time, the effect of such adjustments on the policy behavior. In this manner, certain embodiments of the tool provide an improved user interface that is easier to navigate than previous interfaces, and is able to efficiently provide more information to users than typically available through existing policy illustrations. The display tool will be described in more detail using FIGS. 1 through 5.

I. System Overview

FIG. 1 illustrates an example system 100. As seen in FIG. 1, system 100 includes user(s) 104, device(s) 106 that are configured to display graphical user interface 110, network 112, database 114, and display tool 102. Generally, display tool 102 is configured to access database 114 over network 112 to obtain information about a fixed term policy 118 (e.g., fixed term policy 118a). Display tool 102 then presents this information to user 104 in the form of a graphical user interface 110 displayed on display 108 of device 106. Details about the type of information displayed by graphical user interface 110 and the features offered by graphical user interface 110 are presented below, and in the discussion of FIGS. 3 through 5.

Device 106 is used by user 104 to display graphical user interface 110 on display 108. Device 106 may display graphical user interface 110 on display 108 in any suitable manner. For example, in certain embodiments, display tool 102 is configured to display graphical user interface 110 on display 108 in response to user 104 using device 106 to open a web browser and to use the web browser to navigate to a webpage operated by display tool 102. As additional examples, in certain embodiments, display tool 102 is configured to display graphical user interface 110 on display 108 in response to user 104 opening an application installed on his/her device 106, and/or in response to user 104 performing any other suitable action using device 106.

In certain embodiments, in addition to using device 106 to display graphical user interface 110, in certain embodiments, device 106 is used by user 104 to receive information 132 from display tool 102, and to display this information on graphical user interface 100. In some embodiments, user 104 may also interact with graphical user interface 110 in order to transmit information 130 to display tool 102. For example, user 104 may interact with one or more buttons, links, editable fields, drop-down menus, and/or other interactive features of graphical user interface 110 to communicate information 130 to display tool 102. As a specific example, user 104 may select a button displayed on a first page of graphical user interface 110, thereby instructing device 106 to transmit a request 130 to display tool 102 instructing the graphical user interface to display a second page. In response to receiving such a request 130, display tool 102 may transmit information 132 to device 106, causing graphical user interface 110 to display a second page. As another specific example, user 104 may select a link displayed on graphical user interface 110, thereby instructing device 106 to transmit a request 130 to display tool 102, requesting that a graph of the behavior of the policy associated with the graphical user interface in response to conversion from a fixed term policy into another type (e.g., a whole life insurance policy, a universal life insurance policy, etc.). In response to receiving such request 130, display tool 102 may transmit information 132 to device 106, which includes information used by device 106 to display the request graph on the graphical user interface 110.

Display 108 corresponds to any display associated with device 106 that is used by device 106 to some or all of display information 132 received from display tool 102. Device 106 displays this information on display 108 in the form of graphical user interface 110. In certain embodiments, display 108 is a standard display used in a laptop computer. In some embodiments, display 108 is an external display connected to a laptop or desktop computer. In further embodiments, display 108 is a standard touch-screen display associated with a smartphone or tablet. In certain embodiments, the manner by which graphical user interface 110 is displayed on display 108 depends on the type of device 106. For example, in certain embodiments, the positions of various elements presented on graphical user interface 110 may be optimized for the type of device 106. As a specific example, where device 106 is a smartphone, graphical user interface 110 may be configured to present certain elements positioned vertically-rather than horizontally—with respect to one another, such that user 104 may efficiently view the elements by using his/her finger to scroll vertically through the content displayed by the graphical user interface. On the other hand, where device 106 is a laptop, graphical user interface 110 may be configured to present a larger number of elements positioned horizontally with respect to one another, as the larger size of the display 108 of the laptop, as compared to a smartphone, enables a user to efficiently view such elements displayed horizontally next to one another, by visually scanning in the horizontal direction across the display.

Network 112 facilitates communication between and amongst the various components of system 100. This disclosure contemplates network 112 being any suitable network operable to facilitate communication between the components of system 100. Network 112 may include any interconnecting system capable of transmitting audio, video, signals, data, messages, or any combination of the preceding. Network 112 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. While illustrated in FIG. 1 as a single network, in certain embodiments, network 112 may correspond to multiple networks. For example, network 112 may correspond to an external network over which display tool 102 is configured to communicate with device 106, as well as an internal network over which display tool 102 is configured to communicate with database 114.

Database 114 stores information about a group of fixed term policies 118 (e.g., fixed term life insurance policies) that policy producers have sold to consumers, along with a set of available policies 116 offered by the organization to which display tool 102 belongs (e.g., whole life insurance policies, universal life insurance policies, simplified issue life insurance policies, guaranteed issue life insurance policies, etc.). Specifically, for a given fixed term policy 118a, database 114 stores a set of events 122 associated with the policy, along with a set of conversion options 120 available for the policy. The set of events 122 may include any events 122a through 112s that may be relevant to the fixed term policy. For example, set of events 122 may include (1) a first event 122a corresponding to the creation and/or issuance of the policy, (2) a second event 122b corresponding to the 65th birthday of the user to which the policy belongs (and/or any other suitable user-specific date), (3) a third event 122c corresponding to the date at which it is no longer possible to convert the fixed term policy into another type of policy, (4) a fourth event 122d corresponding to the date at which the level premium period for the policy is scheduled to end, and/or (5) one or more events corresponding to any other suitable dates associated with the policy.

The set of conversion options 120 identify one or more available policies 116 into which the fixed term policy 118 may be converted, prior to expiration of a conversion period (e.g., prior to an event 122 corresponding to the date at which it is no longer possible to convert the fixed term policy into a policy of another type). For example, each conversion option 120a through 120c identifies a particular policy 116a through 116n of the available policies 116 into which fixed term policy 118 may be converted. Set of conversion options 120 may identify any number of available policies 116 into which fixed term policy 118 may be converted. For example, in certain embodiments in which fixed term policy 118 may be converted into any of the available policies 116, set of conversion options 120 may identify each of the available policies 116a through 116n stored in database 114. As another example, in certain embodiments, set of conversion options 120 may identify a subset of available policies 116, where the content of the subset depends on the type of fixed term policy 118, a contract between the producer of the fixed term policy 118 and the consumer of the fixed term policy 118, and/or any other suitable factor.

As illustrated in FIG. 1, display tool 102 includes a processor 124, and a memory 126. This disclosure contemplates processor 124 and memory 126 being configured to perform any of the functions of display tool 102 described herein. Generally, display tool 102: (1) receives a request 130 to view information associated with a given fixed term policy 118, (2) accesses database 114 to obtain information associated with the given fixed term policy 118, (3) generates a graphical user interface 110 associated with the given fixed term policy 118 and displays the graphical user interface 110 on display 108 of user device 106, (4) identifies interactions with components displayed by graphical user interface 110 (e.g., user 104 clicking on a link displayed by graphical user interface 110, user 104 hovering a cursor over an element displayed by graphical user interface 110, user 104 entering text into an interactive field displayed by graphical user interface 110, user 104 selecting an option from a drop-down menu displayed by graphical user interface 110, and/or any other suitable interaction), and (5) updates the content displayed by graphical user interface 110 in response to such interactions. Specific examples of the types of such interactions, and the manner by which display tool 102 updates the content of graphical user interface 110 in response to such interactions are presented below, and in the discussion of FIGS. 3 through 5.

Processor 124 is any electronic circuitry, including, but not limited to microprocessors, application specific integrated circuits (ASIC), application specific instruction set processor (ASIP), and/or state machines, that communicatively couples to memory 126 and controls the operation of display tool 102. Processor 124 may be 8-bit, 16-bit, 32-bit, 64-bit or of any other suitable architecture. Processor 124 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 124 may include other hardware and software that operates to control and process information. Processor 124 executes software 128 stored on memory 126 to perform any of the functions described herein. Processor 124 controls the operation and administration of display tool 102 by processing information received from network 112, user device 106, and memory 126. Processor 124 may be a programmable logic device, a microcontroller, a microprocessor, any suitable processing device, or any suitable combination of the preceding. Processor 124 is not limited to a single processing device and may encompass multiple processing devices. In some embodiments, processor 124 is a processor of device 106.

Memory 126 may store, either permanently or temporarily, data, operational software 128, or other information for processor 124. Memory 126 may include any one or a combination of volatile or non-volatile local or remote devices suitable for storing information. For example, memory 126 may include random access memory (RAM), read only memory (ROM), magnetic storage devices, optical storage devices, or any other suitable information storage device or a combination of these devices. Software instructions 128 represents any suitable set of instructions, logic, or code embodied in a computer-readable storage medium. For example, software instructions 128 may be embodied in memory 126, a disk, a CD, or a flash drive. In particular embodiments, software instructions 128 may include an application executable by processor 124 to perform one or more of the functions described herein.

Modifications, additions, or omissions may be made to the systems described herein without departing from the scope of the invention. For example, system 100 may include any number of users 104, devices 106, networks 112, databases 114, available policies 116 into which one or more fixed term policies 118 may be converted, fixed term policies 118, processors 124, memories 126, requests 130, and/or responses 132. The components may be integrated or separated. Moreover, the operations may be performed by more, fewer, or other components. Additionally, the operations may be performed using any suitable logic comprising software, hardware, and/or other logic.

II. Comparison to Conventional Systems

Figure 3:
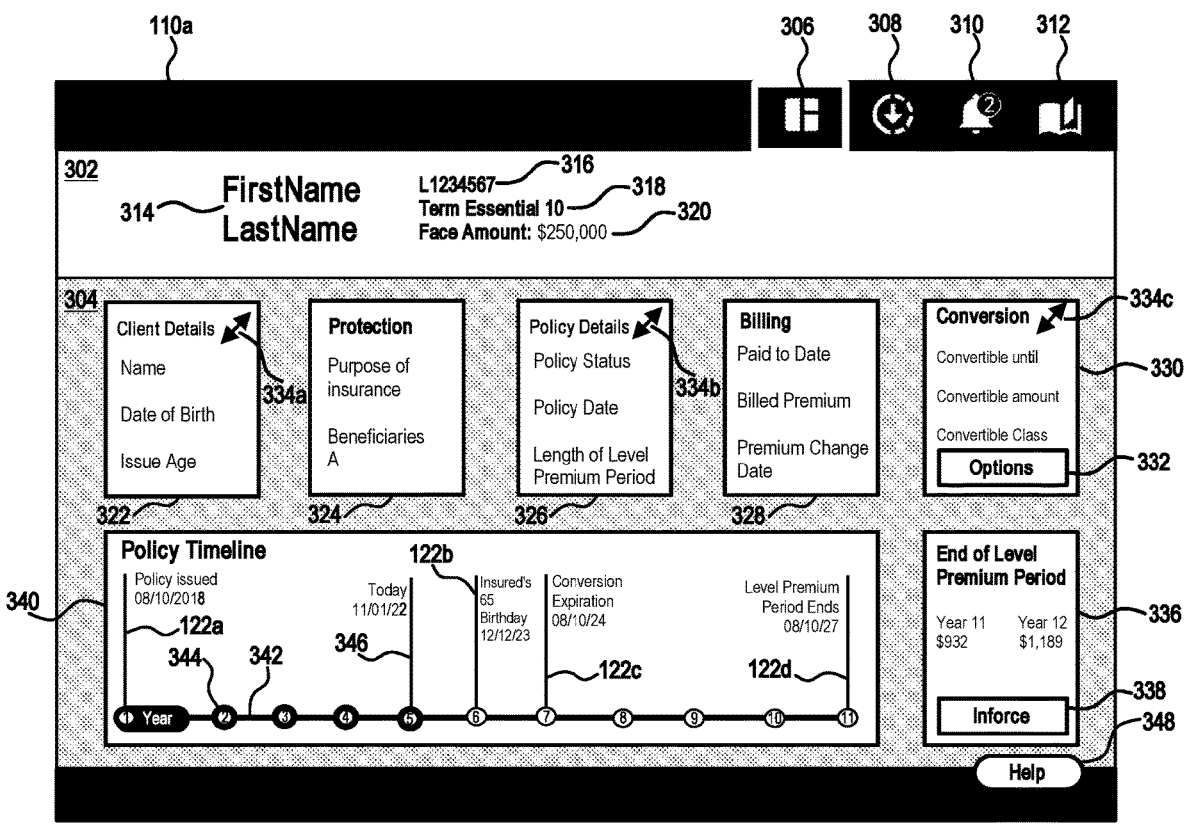
FIG. 3 presents an example first page of a graphical user interface generated by the system of FIG. 1, through which a user may efficiently obtain information associated with a fixed term policy.
Figure 4A:
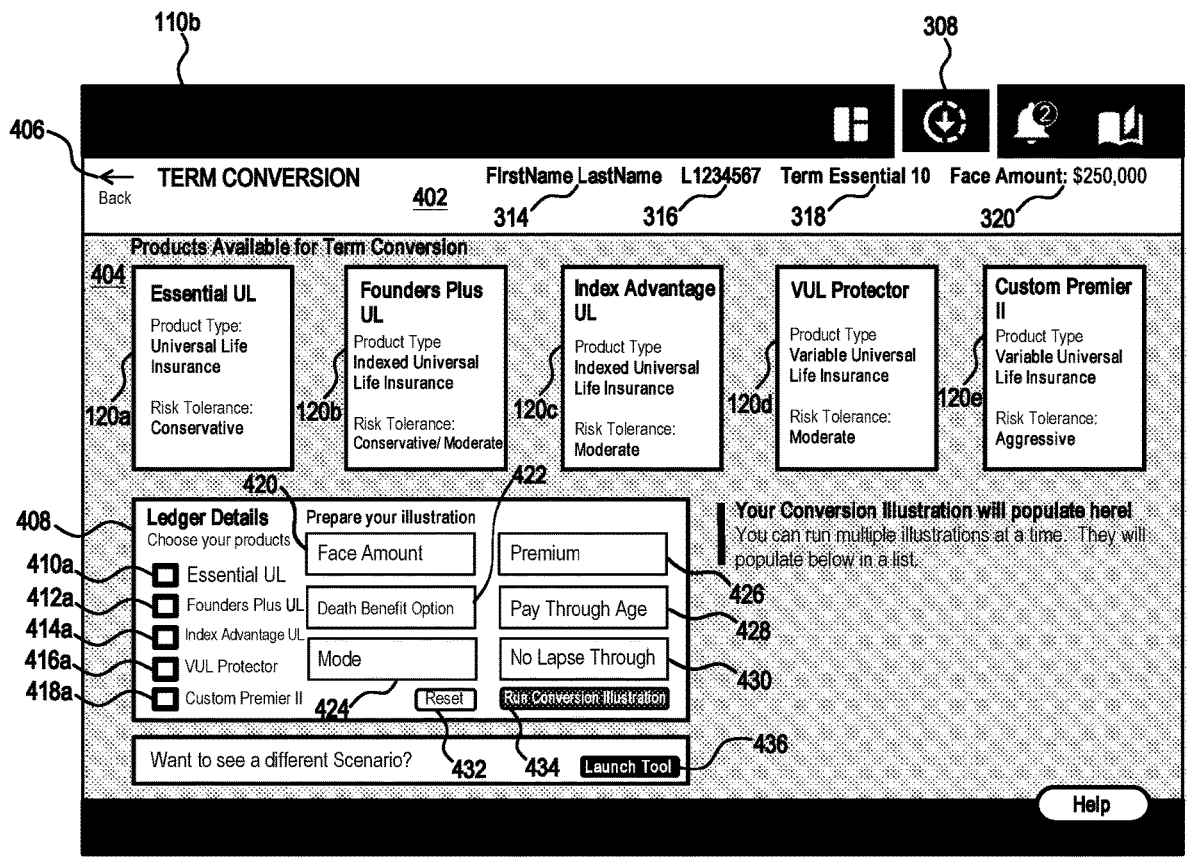
FIGS. 4A through 4C present examples of a second page of a graphical user interface generated by the system of FIG. 1, through which a user may efficiently investigate the behavior of the fixed term policy in response to conversion into a variety of different policy types.
Figure 4B:
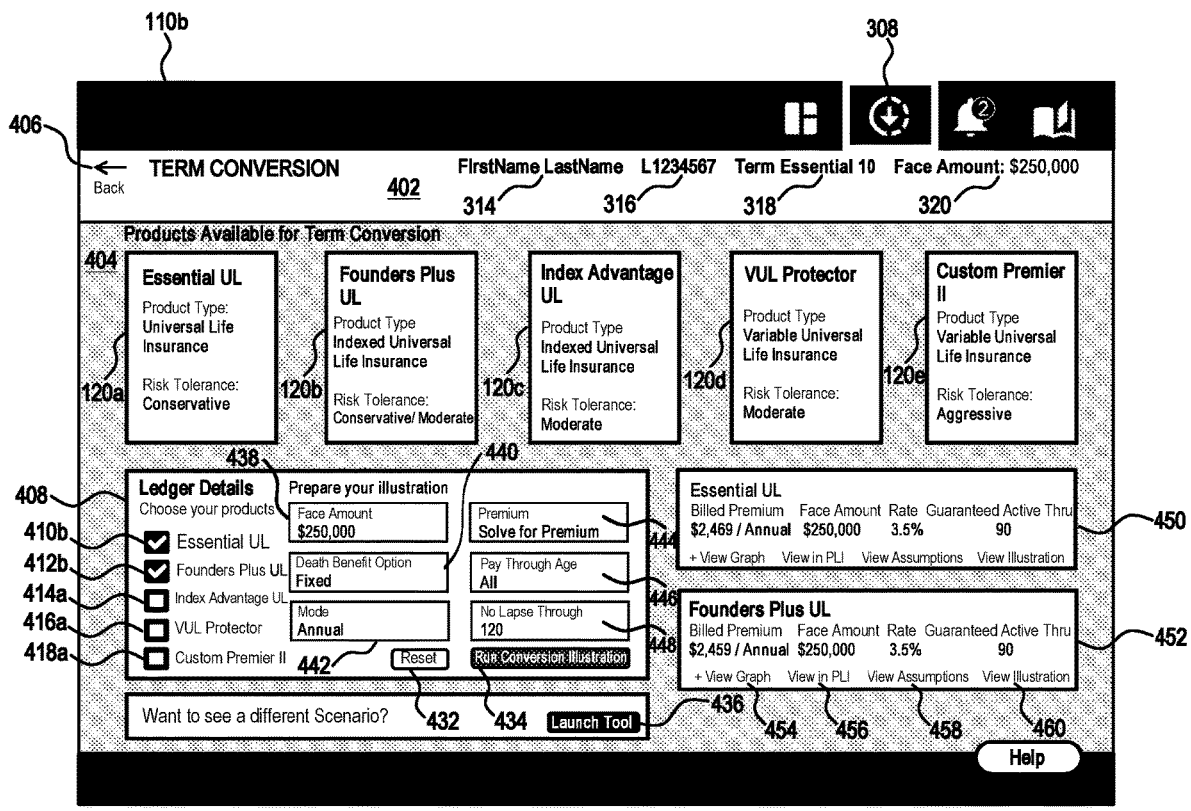
Figure 4C:
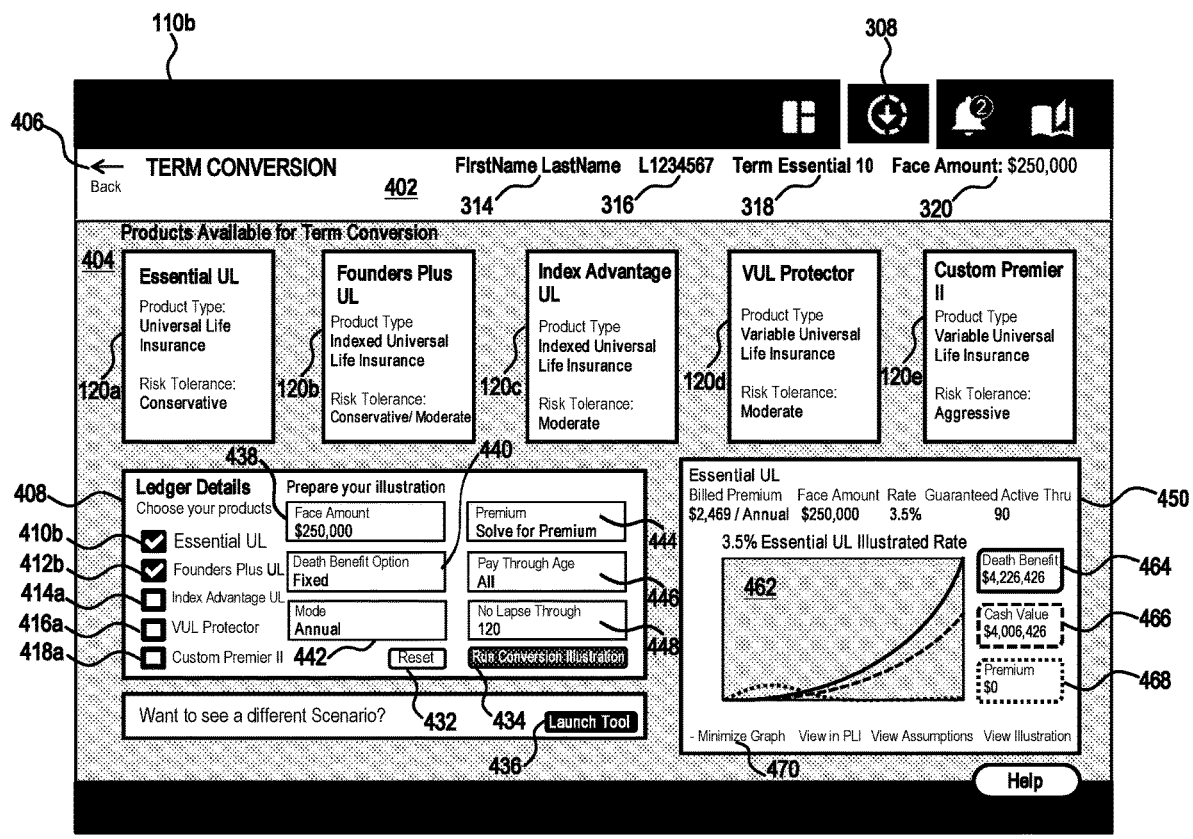

In certain embodiments, display tool 102 provides a producer of life insurance policies with easily accessible information about those policies, by presenting such information in the form of an unconventional graphical user interface 110 on display 108 of a device 106 operated by such producer 104. Graphical user interface 110 is configured to display information associated with a given policy in an easily digestible format designed to enable a policy producer to efficiently gain an overall understanding of the policy. For example, as illustrated in FIG. 3, certain embodiments of the graphical user interface 110 are configured to display graphical representations of information associated with fixed term policies 118, in the form of policy event timelines 340. This disclosure contemplates that such graphical representations are easier to understand than the textual descriptions that are typically found in the policy illustrations that are traditionally presented to producers in the life insurance industry. As another example, as illustrated in FIGS. 4A through 4C, certain embodiments of the graphical user interface 110 are configured to display graphical representations of information associated with conversion options 120 available for fixed term policies 118, which are designed to enable policy producers to efficiently gain an overall understanding of the available conversion options 120. In particular, such graphical representations are easier to understand that the tables and lists of numbers that typically make up the policy illustrations that are traditionally presented to producers in the life insurance industry.

FIG. 2 presents a traditional life insurance policy illustration. As can be seen in FIG. 2, policy information is typically presented to producers through multi-page life insurance policy illustrations 202, which may contain various numbers and tables. This disclosure contemplates that policy producers may find it difficult to locate information within these documents and/or to fully understand the information that is included within the documents. In contrast, display tool 102 may present information associated with a given fixed term life insurance policy 118, including information associated with the conversion options 120 available for the policy, in an interactive and easy to understand manner, through the use of graphical user interface 110, specific embodiments of which are presented below, in FIGS. 3, and 4A through 4C. In certain embodiments, a policy producer may spend considerably more time analyzing the data presented in document 202, illustrated in FIG. 2, to obtain a basic understanding of the behavior of a given fixed term policy (including various potential behaviors of the policy upon conversion into any of a number of other policy types) than he/she could obtain simply by glancing at and/or performing straightforward interactions with graphical user interface 110.

III. Graphical User Interface

FIGS. 3 and 4A through 4C present example embodiments of a graphical user interface 110 for use in efficiently obtaining information about a fixed term life insurance policy 118 and for investigating any of the conversion options 120 available for the policy. In particular, FIG. 3 presents an example embodiment of a first page 110a of the graphical user interface 110 (e.g., the main page of graphical user interface 110), and FIGS. 4A through 4C present example embodiments of a subsequent page 110b of graphical user interface 110 that may be accessed through the first page 110a of the graphical user interface. For example, subsequent page 110b of graphical user interface 110 may be accessed by interacting with a button displayed on first page 110a. For instance, in certain embodiments, subsequent page 110b of graphical user interface 110 may be accessed by interacting with button 308. In some embodiments, subsequent page 110b of graphical user interface 110 may be accessed by interacting with multiple buttons displayed on first page 110a. For example, subsequent page 110b may be accessed by interacting either with button 308 or button 332. The use of multiple buttons 308 and 332, through which a user 104 may access the subsequent page 110b of graphical user interface 110 from the first page 110a of the interface may be desirable to help enable user 104 to efficiently access subsequent page 110a. For example, in certain embodiments, one button 308 for accessing subsequent page 110b may be positioned at a location on first page 110a that is readily identifiable by user 104, when that user first accesses first page 110a (e.g., along a navigation bar located at the top of page 110a, as illustrated in FIG. 3). Positioning button 308 at such a location may enable user 104 to efficiently access page 110b of graphical user interface 110 from first page 110a, for example, in situations in which the user seeks to access page 110b without otherwise interacting to a significant degree with the content display by first page 110a. As another example of the use of multiple buttons 308 and 332, in certain embodiments, a second button 332 for accessing subsequent page 110b may be positioned at a location on first page 110a that is readily identifiable to a user 104 seeking to investigate the various conversion options 120 available to fixed term policy 118, after that user has engaged with certain information displayed on first page 110a (e.g., within a region of first page 110a that displays information related to the conversion of fixed term policy 118 into another policy type).

While FIG. 3 illustrates the use of two buttons 308 and 332 for accessing subsequent page 110b from first page 110a of graphical user interface 110, located at specific positions on first page 110a, this disclosure contemplates that first page 110a may display any number of buttons for use in accessing subsequent page 110b, and that such buttons may be displayed at any suitable locations on first page 110a. Furthermore, while discussed above as being "buttons," this disclosure contemplates that buttons 308 and 332 may correspond to any suitable elements displayed on first page 110a with which user 104 may interact to cause graphical user interface 110 to display second page 110b. For example, buttons 308 and 332 may correspond to buttons, links, and/or any other suitable interactive elements. Furthermore, user 104 may interact with buttons 308/332 in any suitable manner to cause graphical user interface 110 to display subsequent page 110b. For example, in certain embodiments, user 104 may interact with one or more of buttons 308/332 by (1) using a cursor to click on the button, (2) using a cursor to double-click on the button, (3) hovering a cursor over the button, (4) using a finger to touch display 108 of device 106 at a location on the display associated with the location of the button, and/or (5) in any other suitable manner.

While the above discussion describes page 110b of graphical user interface 110 corresponding to a subsequent page of the graphical user interface that is accessible through a first page 110a of the graphical user interface (e.g., a main page), in certain embodiments, page 110b of graphical user interface 110 may itself correspond to the main page of the interface, rather than a subsequent page accessible through a main page. As an example, in certain embodiments, display tool 102 is configured to display page 110b in response to user 104 opening an application installed on his/her device 106, using his/her device 106 to access a webpage operated by display tool 102, and/or performing any other suitable action to access graphical user interface 110.

As illustrated in FIG. 3, first page 110a of graphical user interface 110 is configured to present information associated with a fixed term policy associated with a particular individual. As illustrated in FIG. 3, in certain embodiments, first page 110a includes a first region 302 and a second region 304. First region 302 of first page 110a is configured to present a high-level overview of the fixed term policy for which graphical user interface 110 is currently presenting information. For example, as illustrated in FIG. 3, first region 302 may present the name 314 of the individual associated with the fixed term policy (e.g., the name of the individual for whom the fixed term life insurance policy is providing coverage), an identification number 316 associated with the individual (e.g., a policy number), a name 318 of the particular fixed term policy 118 assigned to the individual, and a face amount 320 of the fixed term policy.

Information 314 through 320 may be stored by display tool 102 within database 114 as part of the information associated with a given fixed term policy 118.

Second region 304 of first page 110a is configured to present further details associated with the fixed term policy 118, while nevertheless providing such details in an easy-to-understand form. For example, in certain embodiments, second region 304 of first page 110a is configured to present summarized information associated with the policy in regions 322, 324, 326, 328, 330, and 336 of first page 110a, along with a timeline 340 of events associated with the policy. In particular, region 322 of page 110a may be configured to display information associated with the individual to which the policy belongs including, for example, the name of the individual, his/her date of birth, and his/her age at the time the policy was issued. Region 324 of page 110a may be configured to display information about the protection provided by the policy including, for example, the purpose for the policy, and the beneficiaries of the policy. Region 326 of page 110a may be configured to display particular details associated with the policy including, for example, the status of the policy (e.g., whether or not the policy is currently active), the date at which the policy was issued, and the length of time after issuance for which the policy premiums are level premiums). Region 328 of page 110a may be configured to display billing information associated with the policy including, for example, the date at which the next premium payment for the policy is due, the amount of the premium for the policy, and the date at which the premium payments change from level premium payments to variable premium payments (e.g., premium payments that increase year over year). Region 330 of page 110a may be configured to display information about the conversion options available to the policy including, for example, the date until which the policy remains convertible from a fixed term policy into a policy of another type, the amount of the policy that is convertible (e.g., the face amount of the policy 320, a portion of the face amount, etc.), and a convertibility class for the policy (e.g., "Preferred," "Preferred Best," etc.). In certain embodiments, the convertibility class may identify the available policies 116 into which the fixed term policy 118 may be converted, prior to the date until which the policy is no longer convertible. As illustrated in FIG. 3, in certain embodiments, region 330 of first page 110a may also display a conversion options button 332. As described above, conversion options button 332 is selectable by user 104 to cause graphical user interface 110 to display second page 110b, example embodiments of which are described below, in the discussion of FIGS. 4A through 4C. In this manner, user 104 may be able to view the conversion options 120 available to the fixed term policy 118, as well as investigate the behavior of the policy upon conversion into one or more of the available conversion options 120. As explained above, by placing conversion options button 332 within region 330, page 110a of graphical user interface 110 enables user 104 to efficiently access/ investigate the conversion options 120 available to policy 118. In particular, this disclosure contemplates that, while a user 104 is considering the information presented in region 304 of page 110a, that user is most likely to seek to access/investigate the conversion options 120 available to policy 118 in response to viewing the conversion information presented in region 330. Accordingly, placing conversion options button 332 within region 330 helps to ensure that button 332 is readily available to such a user 104, thereby helping to conserve the user's time (and the computational resources of device 106/display tool 102), otherwise associated with searching within page 110a for a way to access second page 110b. This may be particularly effective in certain embodiments in which page 110a is displayed on a mobile device. In such embodiments, only a portion of the content of page 110a may be visible on display 108 of device 106 at any given time. Accordingly, displaying button 332 within region 330 may help to ensure that user 104 need not scroll through the content of page 110a searching for a way to access second page 110b, in response to viewing the information displayed within region 330.

Region 336 of first page 110a is configured to display information associated with the behavior of the policy, after the end of the level premium period assigned to the policy. For example, FIG. 3 illustrates a fixed term policy 118 with a level premium period of 10 years. This indicates that for the 10 years after the policy has issued, the premiums associated with the policy remain fixed. At the end of the level premium period, the premiums associated with the policy may change. FIG. 3 illustrates an example in which, after the level premium period expires, the premiums for the policy increase year-over-year. As illustrated in FIG. 3, in certain embodiments, region 336 is also configured to display inforce button 338. Inforce button 338 is an interactive button, selectable by user 104, to further investigate the behavior of policy 118 upon expiry of the level premium period. For example, in response to user 104 interacting with inforce button 338, device 106 may be configured to open and display an illustration associated with the policy to investigate the behavior of policy 118 upon expiration of the level premium period.

As mentioned above, second region 304 of first page 110a is configured to present further details associated with the fixed term policy 118b in an easy-to-understand form. In particular, in certain embodiments, each of regions 322, 324, 326, 328, 330, and 336 present high level summarizes of the policy information to which the region is directed (e.g., region 322 displays a high-level summary of the details of the individual to which the policy is associated). In certain embodiments, this enables user 104 to easily obtain important information about the policy, without having to wade through a large quantity of information. However, this disclosure contemplates that, in certain embodiments, user 104 may seek additional information that may not be visible within regions 322, 324, 326, 328, 330, and 336, as those regions are initially displayed on page 110a. Accordingly, in certain embodiments, page 110a includes one or more interactive elements through which user 104 may view such additional information. As an example, in certain embodiments, one or more of regions 322, 324, 326, 328, 330, and 336 may include a scroll bar through which user 104 may interact to view additional information within the region. As another example, in certain embodiments, one or more of regions 322, 324, 326, 328, 330, and 336 may include an expansion element 334, through which the user may interact to expand the area of the region, as displayed on display 108, in order to enable the region to display additional information.

Region 340 of page 110a of graphical user interface 110 is configured to present a timeline 342 of events 122 associated with fixed term policy 118. As illustrated in FIG. 3, timeline 324 may be configured to display identifications of the yearly anniversary dates of the policy issuance (e.g., indication 344 of the first anniversary of the issuance of the policy). Timeline 324 may also display identifications of events 122a through 122d associated with the policy. For example, as illustrated in FIG. 3, timeline 324 displays an indication of event 122a, corresponding to the issuance of the policy, an indication of event 122b, corresponding to the 65th birthday of the individual associated with the policy, an indication of event 122c, corresponding to the date at which the option to convert the policy into any of the available conversion options 120 expires, and an indication of event 122d, corresponding to the date at which the level premium period for the fixed term policy ends. While FIG. 3 illustrates each event 122a through 122d identified on timeline 342 as a vertical line accompanied with a description of the event, this disclosure contemplates that each of events 122 may be identified on timeline 342 in any suitable manner. In certain embodiments, in response to user 104 interaction with an identification of an event 122 displayed on timeline 342, display tool 102 is configured to cause graphical user interface 110 to display additional information associated with the event. Display tool 102 may cause graphical user interface 110 to display such additional information in any suitable format. For example, in certain embodiments, display tool 102 may cause graphical user interface 110 to display a tooltip that includes the additional information.

As illustrated in FIG. 3, in certain embodiments, page 110a displays a number of additional elements designed to aid user 104 in obtaining information associated with policy 118. As an example, at the top of the page, graphical user interface 110 may display a navigation bar that includes a first button 306 associated with first page 110a of graphical user interface 110, and a second button 308 associated with second page 110b of graphical user interface 110. User 104 may interact with either button to easily navigate between first page 110a and second page 110b. In certain embodiments, graphical user interface 110 is also configured to display a notification element 310. Notification element 310 is configured to alert user 104 to any notifications 132 associated with policy 118 that were transmitted by display tool 102 to device 106. Such notifications may relate to one or more of the events 122 displayed on timeline 342. For example, prior to the occur of an event 122, display tool 102 may be configured to transmit a notification 132 to device 106, informing user 104 of the upcoming event. In response to receiving the notification, graphical user interface 110 may be configured to modify notification element 310, as displayed on the interface, to indicate that a new notification has been received (e.g., add/adjust a number displayed by notification element 310 to indicate the number of new notifications that have been received). In certain embodiments, notification element 310 is an interactive element. In such embodiments, in response to user 104 interacting with the element, graphical user interface 110 is configured to display details of the received notification(s) 132.

In certain embodiments, in addition to displaying notifications 132 within graphical user interface 110, device 106 may be configured to receive and display notifications 132 from display tool 102 outside of graphical user interface 110. For example, in certain embodiments, display tool 102 may transmit one or more notifications 132 to device 106 in the form of SMS messages, emails, pop-ups configured to automatically display themselves on display 108 of device 106, and/or any other suitable form. In certain embodiments, each such notification 132 may include a link through which user 104 may access graphical user interface 110.

Graphical user interface 110 may also be configured to display one or more elements through which user 104 may obtain information useful in navigating the interface, and/or obtaining information related to the policy 118 associated with the interface. For example, graphical user interface 110 may display resource element 312, with which user 104 may interact to access one or more available resources that may provide user 104 with information regarding how to navigate graphical user interface 110, and/or obtain information about policy 118. In some embodiments, graphical user interface 110 may also display help element 348. Help element 348 may be configured to (1) connect user 104 with an agent who may be able to answer questions that the user may have, (2) provide user 104 with one or more resources through which the user may obtain information regarding how to navigate graphical user interface 110 and/or obtain information about policy 118, and/or (3) any other suitable help that may aid user 104 is using graphical user interface 110.

FIGS. 4A through 4C illustrate example embodiments of second page 110b of graphical user interface 110. As described above, second page 110b may be used by user 104 to investigate the potential behavior(s) of policy 118 upon conversion of the policy into one or more of the available conversion options 120 for the policy.

FIG. 4A illustrates an example embodiment of second page 110b in response to user 104 first navigating to second page 110b from first page 110a. As illustrated in FIG. 4A, second page 110b includes a first region 402 that presents all of the same information as first region 302 of first pate 110a, as well as a second region 404. Second region 404 presents each of conversion options 120a through 120e, stored for policy 118. For each of conversion options 120a through 120e, page 110b is configured to display information about the policy 116 associated with the conversion option. For example, conversion option 120a, which corresponds to the option to convert fixed term policy 118 into an "Essential UL" policy 116, displays information associated with that policy. Similarly, conversion option 120b, which corresponds to the option to convert fixed term policy 118 into a "Founders Plus UL" policy 116, displays information associated with that policy. Each of conversion options 120a through 120e, displayed on second page 110b, in configured to provide a high-level overview of the associated policy 116. For example, in certain embodiments, each of conversion options 120a through 120e is configured to display a type of the policy 116 (e.g., universal life insurance, indexed universal life insurance, variable universal life insurance, etc.), and a risk tolerance associated with the policy (e.g., conservative, conservative/moderate, moderate, aggressive, etc.). In this manner, certain embodiments of graphical user interface 110 enable user 104 to easily access relevant information user 104 may seek in evaluating the various conversion options 120a through 120e, without requiring the user to wade through a large amount of information to obtain such information. For example, where user 104 knows that the individual to whom policy 118 is associated is considering converting the policy into one of conversion options 120a through 120e, but is risk-adverse, user 104 may automatically eliminate conversion option 120e from consideration based on page 110b presenting information indicating that the risk tolerance associated with such policy is "aggressive." In contrast, user 104 may otherwise have had to search through multiple pages of information associated with the policy 116 corresponding to conversion option 120e, before determining that this policy is not suitable for a risk-adverse individual.

While illustrated in FIG. 4A as including a set of five conversion options 120a through 120e, this disclosure contemplates that any number of conversion options 120 may be available for a given fixed term policy 118. Furthermore, while illustrated in FIG. 4A as graphical user interface 110 displaying all of the conversion options 120 on page 110b, in certain embodiments in which a large number of conversion options 120 are available for policy 118, page 110b may be configured to display only a subset of those conversion options, with the remaining conversion options available through a scroll bar. This may help to ensure that the information displayed on page 110b for each of the conversion options 120a through 120e is of a suitable text size such that it is easily digestible by user 104.

As illustrated in FIG. 4A, second page 110b of graphical user interface 110 is also configured to display a region 408 designed to enable user 104 to investigate the potential behavior of fixed term policy 118, upon conversion of the policy into a policy of another type. In certain embodiments, for each conversion options 120 available to policy 118, region 408 is configured to display an element (e.g., elements 410a through 418a) through which user 104 may interact in order to select the policy 116 associated with the conversion option. In response to user 104 interacting with a given element of elements 410a through 418a, display tool 102 is configured to update the appearance of the element on page 110b, to indicate that the element has been selected. For example, in response to user 104 interacting with elements 410a and 412a, corresponding to the "Essential UL" conversion option 120a and the "Founders Plus UL" conversion option 120b, respectively, display tool 102 may be configured to change elements 410a and 412a of FIG. 4A to updated elements 410b and 412b of FIGS. 4B and 4C.

Region 408 of page 110b may also be configured to display a set of interactive fields 420 through 430, through which user 104 may specify options for the selected policies 116. For example, as illustrated in FIG. 4A, in certain embodiments, region 408 may display field 420, into which user 104 may specify a face amount for the policy 116 (e.g., the face amount of the fixed term policy 116, a portion of the face amount of the fixed term policy 116, and/or any other suitable amount), a death benefit option 422 for the policy (e.g., variable, or fixed death benefit), a mode 424 for the policy (e.g., annual, semi-annual, monthly, etc.), a premium payment amount 426 for the policy, a "pay through age" (e.g., 80 year, 90 years, all years), and a "no lapse through" value 430, corresponding to a length of time through which the policy 118 is not to lapse. In certain embodiments, user 104 may enter information into fields 420 through 430 by entering such information into the fields using a keypad. In some embodiments, user 104 may enter information into fields 420 through 430 by selecting such information using a drop-down menu. In certain embodiments, user 104 may specify values for all of the fields 420 through 430. In some embodiments, user 104 may specify values for a subset of the fields 420 through 430, and rely on display tool 102 to generate the other values. As an example, user 104 may enter values for the face amount 420, the death benefit option 422, the mode 424, the pay through age 428, and the no lapse through time 430, and rely on display tool 102 to solve for the corresponding premium value 426.

In response to user 104 selecting one or more conversion options 120a through 120e, by interacting with one or more of elements 410a through 418a, and entering information into fields 420 through 430, user 104 may instruct graphical user interface 110 to display illustrations associated with the policies 116 corresponding to the selected conversion options 120, where parameters associated with those policies are specified through the information 438 through 448 provided in fields 420 through 430, as illustrated in FIG. 4B. To do so, in certain embodiments, user 104 may interact with button 434 displayed in region 408.

Region 408 additionally displays a reset button 432, through which user 104 may interact, in order to reset region 408 to its default appearance (e.g., prior to user 104 interacting with elements displayed within the region).

In response to user 104 instructing graphical user interface 110 to display illustrations associated with the policies 116 corresponding to the selected conversion options 120 (for example, by interacting with button 434), second page 110b of graphical user interface 110 is configured to present such illustration to user 104, as described below in the discussion of FIGS. 4B and 4C.

As illustrated in FIG. 4B, in response to user 104 instructing graphical user interface 110 to display illustrations associated with the policies 116 corresponding to the selected conversion options 120, page 110b of graphical user interface 110 is configured to display information associated with the potential behavior of policy 118 upon conversion into the policies 116 corresponding to the selected conversion options 120. For example, page 110b is configured to display information 450 associated with the potential behavior of policy 118 upon conversion into the selected "Essential UL" policy 118, and information 452 associated with the potential behavior of policy 118 upon conversion into the selected "Founders Plus UL" policy 118. Each set of information 450 and 452 includes types of information common between the various policies 116 that are available as conversion options 120. For example, each set of information 450 and information 452 includes a billed premium amount, a face among, a rate, and a guaranteed active thru date. By displaying types of information that is common between the various policies 116 that are available as conversion options 120, certain embodiments of graphical user interface 110 generated by display tool 102 enable user 104 to perform direct and computationally efficient comparisons between the various conversion options available for fixed term policy 118.

As illustrated in FIG. 4B, each set of policy illustration information 450/452 is also configured to display additional information associated with the behavior of policy 118 upon conversion of the policy into one of the available policies 116 specified through the conversion options 120a through 120e available for the fixed term policy 118. For example, each set of policy illustration information 450/452 may be configured to display (1) element 454, through which user 104 may interact to view a graph of the policy illustration (as illustrated in FIG. 4C), (2) element 456, through which user 104 may interact to further investigate the potential behavior of policy 118 upon conversion into one of the policies 116 associated with available conversion options 120a through 120e, by, for example, causing display tool 102 to display the graphical user interface described in U.S. Pat. No. 10,896,190, (3) element 458, through which user 104 may interact to view the assumptions used in generating the illustrations, (4) element 460, through which user 104 may access an electronic document (e.g., download a PDF document) of the illustration, and/or (5) any other suitable element that may be displayed within the set of policy information 450/452.

As an example, FIG. 4C illustrates second page 110b of graphical user interface 110, in response to user 104 interacting with element 454 of policy illustration information 450, to view a graph 462 of the policy illustration, displayed within the set of policy illustration information 450. As illustrated in FIG. 4C, in certain embodiments, graph 462 displays a death benefit 464 of the policy over time, a cash value 466 of the policy over time, and a premium value 468 for the policy over time. This disclosure contemplates that graph 462 may display any suitable values associated with the policy over time. In certain embodiments, user 104 may cause page 110*b* of graphical user interface 110 to display multiple graphs 462. For example, user 104 may cause page 110*b* to display a graph 462 for each conversion option 120 under consideration by the user (e.g., each policy 118 associated with a selection 410*b*, 412*b*, etc.). Enabling user 104 to view multiple graphs 462 at the same time may enable the user to easily and efficiently compare multiple conversion options 120 with one another. Furthermore, in certain embodiments, page 110*b* may enable user 104 to view multiple graphs 462 associated with the same policy 118 (e.g., "Essential UL" policy 118), but with different values for the parameters 438 through 448, specified by fields 420 through 430.

In certain embodiments, page 110*b* of graphical user interface 110 is configured to display a button 436, through which user 104 may interact in order to perform a more detailed investigation of a potential conversion option 120. For example, in response to user 104 interacting with button 436, display tool 102 may be configured to generate a new policy illustration, e.g., by launching a separate and distinct application for generating policy illustrations.

Figure 5:
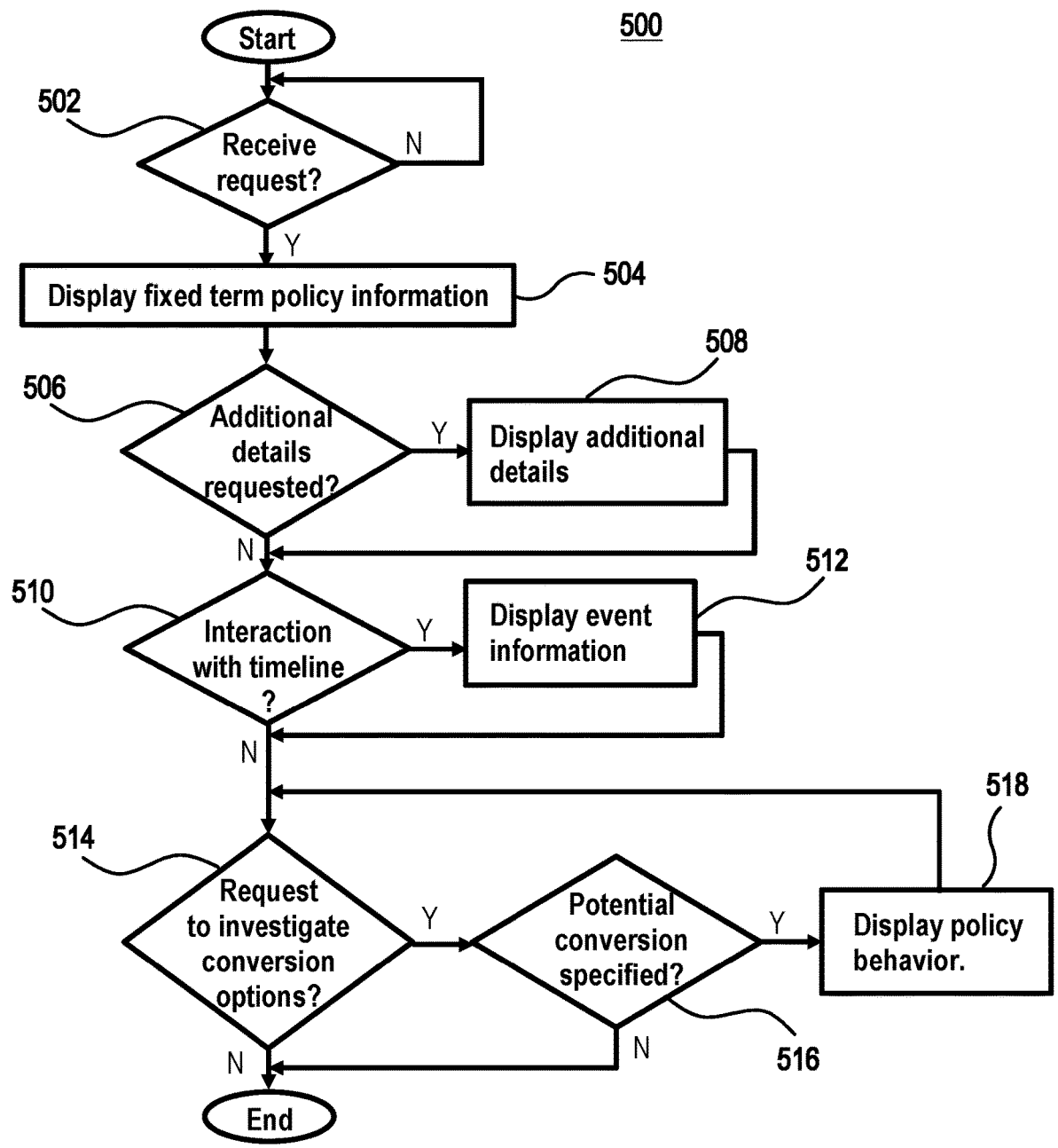
FIG. 5 presents a flowchart illustrating the process by which the system of FIG. 1 displays information on the graphical user interface of FIGS. 3 and 4A through 4C.

IV. Method for Efficiently Providing Information Through the Graphical User Interface FIG. 5 presents an example process (described in conjunction with elements of FIGS. 1 through 4C) by which display tool 102 generates graphical user interface 102, and provides information to users 104 through graphical user interface.

During operation 502 display tool 102 determines whether it has received a request 130 related to a given fixed term policy 118. For example, the tool may determine whether a user 104 has used device 106 to access (1) a webpage configured to provide access to information associated with policy 118, (2) an application installed on the device and configured to provide access to information associated with policy 118, and/or (3) used device 106 in any other suitable manner to request access to information associated with policy 118. If, during operation 502 display tool 102 determines that it has received a request 130, during operation 504 display tool 102 displays first page 110*a* of graphical user interface 110 on display 108 of device 110. As explained above, in the discussion of FIG. 3, in certain embodiments, first page 110*a* of graphical user interface 110 is configured to display a first region 302, which presents a high-level overview of the fixed term policy 118 under consideration, as well as a second region 304, which presents further details associated with the policy. In particular, in certain embodiments, second region 304 may display (1) information 322 associated with the individual to which the policy belongs including, for example, the name of the individual, his/her date of birth, and his/her age at the time the policy was issued, (2) information 324 about the protection provided by the policy including, for example, the purpose for the policy, and the beneficiaries of the policy, (3) information 326 corresponding to particular details associated with the policy including, for example, the status of the policy (e.g., whether or not the policy is currently active), the date at which the policy was issued, and the length of time after issuance for which the policy premiums are level premiums), (4) billing information 328 associated with the policy including, for example, the date at which the next premium payment for the policy is due, the amount of the premium for the policy, and the date at which the premium payments change from level premium payments to variable premium payments (e.g., premium payments that increase year over year), (5) information 330 about the conversion options available to the policy including, for example, the date until which the policy remains convertible from a fixed term policy into a policy of another type, the amount of the policy that is convertible (e.g., the face amount of the policy 320, a portion of the face amount, etc.), and a convertibility class for the policy (e.g., "Preferred," "Preferred Best," etc.), (6) information 336 associated with the behavior of the policy, after the end of the level premium period assigned to the policy, and/or (7) any other suitable information associated with the policy and/or the behavior of the policy. In some embodiments, second region 304 of first page 110*a* is configured to display a timeline 342 of events 122 associated with fixed term policy 118.

During operation 506 display tool 102 determines whether user 104 has requested any additional information associated with the fixed term policy 118, which is not displayed on first page 110*a*. For example, display tool 102 may determine whether user 104 has interacted with a scroll bar and/or expansion button 334*a* through 334*c* displayed on first page 110*a* of graphical user interface 110 to view additional information associated with the fixed term policy 118. If, during operation 506 display tool 102 determines that user 104 has requested additional information associated with fixed term policy 118, during operation 508 display tool 102 displays the additional information on first page 110*a*. Method 500 then proceeds to operation 510. If during operation 506 display tool 102 determines that user 104 has not request any additional information associated with fixed term policy 118, method 500 proceeds directly to operation 510.

During operation 510 display tool 102 determines whether user 104 has interacted with an event 122 displayed on timeline 342. For example, display tool 102 may determine whether user 104 has clicked on, double-clicked on, hovered over, touched, and/or interacted with an event 122 displayed on timeline 342 in any other suitable manner. If, during operation 510 display tool 102 determines that user 104 has interacted with an event 122 displayed on timeline 342, during operation 512 display tool 102 displays information associated with the event 122 on graphical user interface 110. For example, display tool 102 may cause graphical user interface 110 to display a tooltip associated with the event 122 on timeline 342, which includes the information associated with the event. Method 500 then proceeds to operation 514. If during operation 510 display tool 102 determines that user 104 has not interacted with an event 122 displayed on timeline 342, method 500 proceeds directly to operation 514.

During operation 514 display tool 102 determines whether it has received a request 130 from a user 104 seeking to investigate the behavior of policy 118 in response to potential conversions of the policy according to one or more of the available conversion options 120. For example, display tool 102 may determine whether user 104 has interacted with button 332 or button 308, as described above in the discussion of FIG. 3. If, during operation 514 display tool 102 determines that it has received a request 130 from a user seeking to investigate the behavior of policy 118 in response to potential conversions of the policy according to one or more of the available conversion options 120, during operation 516 display tool 102 causes graphical user interface 110 to display second page 110*b*. Display tool 102 then determines whether user 104 has specified a policy 116, along with associated policy parameters, into which fixed term policy 118 may be converted. If, during process 516 display tool 102 determines that user 104 has specified a policy 116 into which fixed term policy 118 may be converted, during process 518 display tool causes second page 110b of graphical user interface 110 to display information associated with the behavior of the policy 118 upon conversion into the specified policy 116. The method then returns to operation 516, during which display tool 102 determines whether user 104 has specified any other policies 116 for investigation.

Modifications, additions, or omissions may be made to method 500 depicted in FIG. 5. Method 500 may include more, fewer, or other operations. For example, operations may be performed in parallel or in any suitable order. While discussed as display tool 102, or graphical user interface 110, generated by display tool 102, performing certain operations, any suitable components of system 100, including, for example, devices 106, may perform one or more operations of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a display;
a memory comprising information associated with a policy of a first type, the information associated with the policy comprising:
 a list of events associated with the policy, each event of the list of events assigned a date, the list of events comprising a conversion expiration event occurring on a conversion expiration date; and
 an identification of one or more conversion options available for the policy, each conversion option of the one or more conversion options associated with a new policy type of a set of new policy types into which the policy is convertible prior to occurrence of the conversion expiration event; and
a hardware processor communicatively coupled to the memory, the hardware processor configured to:
 present, on the display, a first page of a graphical user interface associated with the policy, the first page displaying:
  a timeline comprising a plurality of points, each point of the plurality of points corresponding to an event of the list of events associated with the policy; and
  a feature selectable by a user to investigate the one or more conversion options available for the policy;
 receive information associated with a selection of the feature; and
 in response to receiving the information associated with the selection of the feature:
  present, on the display, a second page of the graphical user interface, the second page displaying the one or more conversion options, each conversion option being selectable by the user to investigate a behavior of the policy upon conversion of the policy from the first type to the new policy type associated with the conversion option;
  receive information associated with a selection of a first conversion option of the one or more conversion options; and
  in response to receiving the information associated with the selection of the first conversion option, display, on the second page of the graphical user interface, a graph illustrating the behavior of the policy upon conversion from the first type to the new policy type associated with the first conversion option.

2. The apparatus of claim 1, wherein the feature comprises at least a first button located at a first position on the first page and a second button located at a second position on the first page different from the first position, each of the first button and the second button being selectable by the user to navigate to the second page.

3. The apparatus of claim 1, wherein the hardware processor is further configured to:
determine that a particular event of the list of events is scheduled to occur within a threshold time; and
in response to determining that the particular event is scheduled to occur within the threshold time, display a notification associated with the particular event on at least one of the first page and the second page.

4. The apparatus of claim 1, wherein the hardware processor is further configured to:
determine that a particular event of the list of events is scheduled to occur within a threshold time; and
in response to determining that the particular event is scheduled to occur within the threshold time, transmit a message to a device of the user, the message indicating that the particular event is scheduled to occur.

5. The apparatus of claim 1, wherein the hardware processor is further configured to:
receive information associated with an interaction with a particular point on the timeline; and
in response to receiving the information associated with the interaction with the particular point on the timeline, display a tooltip on the display, the tooltip comprising information associated with the event corresponding to the particular point.

6. The apparatus of claim 1, wherein the hardware processor is further configured to:
receive information associated with a selection of a second conversion option of the one or more conversion options; and
in response to receiving the information associated with the selection of the second conversion option, display, on the second page of the graphical user interface, a graph illustrating the behavior of the policy upon conversion from the first type to the new policy type associated with the second conversion option.

7. The apparatus of claim 1, wherein, in response to receiving the information associated with the selection of the first conversion option, the hardware processor is further configured to:
display, on the second page of the graphical user interface, a link selectable by the user to download an illustration associated with the policy after conversion from the first type to the new policy type associated with the first conversion option;
receive information associated with a selection of the link; and
in response to receiving the information associated with the selection of the link, download a file corresponding to the illustration.

8. A method comprising:
presenting, on a display, a first page of a graphical user interface associated with a policy, the first page displaying:

a timeline comprising a plurality of points, each point of the plurality of points corresponding to an event of a list of events associated with the policy, each event of the list of events assigned a date, the list of events comprising a conversion expiration event occurring on a conversion expiration date; and a feature selectable by a user to investigate one or more conversion options available for the policy, each conversion option of the one or more conversion options associated with a new policy type of a set of new policy types into which the policy is convertible prior to occurrence of the conversion expiration event;

receiving information associated with a selection of the feature; and in response to receiving the information associated with the selection of the feature:

presenting, on the display, a second page of the graphical user interface, the second page displaying the one or more conversion options, each conversion option being selectable by the user to investigate a behavior of the policy upon conversion of the policy from the first type to the new policy type associated with the conversion option;

receiving information associated with a selection of a first conversion option of the one or more conversion options; and in response to receiving the information associated with the selection of the first conversion option, displaying, on the second page of the graphical user interface, a graph illustrating the behavior of the policy upon conversion from the first type to the new policy type associated with the first conversion option.

9. The method of claim 8, wherein the feature comprises at least a first button located at a first position on the first page and a second button located at a second position on the first page different from the first position, each of the first button and the second button being selectable by the user to navigate to the second page.

10. The method of claim 8, further comprising:
determining that a particular event of the list of events is scheduled to occur within a threshold time; and
in response to determining that the particular event is scheduled to occur within the threshold time, displaying a notification associated with the particular event on at least one of the first page and the second page.

11. The method of claim 8, further comprising:
determining that a particular event of the list of events is scheduled to occur within a threshold time; and
in response to determining that the particular event is scheduled to occur within the threshold time, transmitting a message to a device of the user, the message indicating that the particular event is scheduled to occur.

12. The method of claim 8, further comprising:
receiving information associated with an interaction with a particular point on the timeline; and
in response to receiving the information associated with the interaction with the particular point on the timeline, displaying a tooltip on the display, the tooltip comprising information associated with the event corresponding to the particular point.

13. The method of claim 8, further comprising:
receiving information associated with a selection of a second conversion option of the one or more conversion options; and in response to receiving the information associated with the selection of the second conversion option, displaying, on the second page of the graphical user interface, a graph illustrating the behavior of the policy upon conversion from the first type to the new policy type associated with the second conversion option.

14. The method of claim 8, wherein, in response to receiving the information associated with the selection of the first conversion option, the method further comprises:
displaying, on the second page of the graphical user interface, a link selectable by the user to download an illustration associated with the policy after conversion from the first type to the new policy type associated with the first conversion option;
receiving information associated with a selection of the link; and
in response to receiving the information associated with the selection of the link, downloading a file corresponding to the illustration.

15. A non-transitory computer-readable medium comprising instructions that, when executed by a hardware processor, cause the hardware processor to:
present, on a display, a first page of a graphical user interface associated with a policy, the first page displaying:
a timeline comprising a plurality of points, each point of the plurality of points corresponding to an event of a list of events associated with the policy, each event of the list of events assigned a date, the list of events comprising a conversion expiration event occurring on a conversion expiration date; and
a feature selectable by a user to investigate one or more conversion options available for the policy, each conversion option of the one or more conversion options associated with a new policy type of a set of new policy types into which the policy is convertible prior to occurrence of the conversion expiration event;
receive information associated with a selection of the feature; and
in response to receiving the information associated with the selection of the feature:
present, on the display, a second page of the graphical user interface, the second page displaying the one or more conversion options, each conversion option being selectable by the user to investigate a behavior of the policy upon conversion of the policy from the first type to the new policy type associated with the conversion option;
receive information associated with a selection of a first conversion option of the one or more conversion options; and
in response to receiving the information associated with the selection of the first conversion option, display, on the second page of the graphical user interface, a graph illustrating the behavior of the policy upon conversion from the first type to the new policy type associated with the first conversion option.

16. The non-transitory computer-readable medium of claim 15, wherein the feature comprises at least a first button located at a first position on the first page and a second button located at a second position on the first page different from the first position, each of the first button and the second button being selectable by the user to navigate to the second page.

17. The non-transitory computer-readable medium of claim 15, wherein the instructions, when executed by the hardware processor, further cause the hardware processor to:
  determine that a particular event of the list of events is scheduled to occur within a threshold time; and
  in response to determining that the particular event is scheduled to occur within the threshold time, display a notification associated with the particular event on at least one of the first page and the second page.

18. The non-transitory computer-readable medium of claim 15, wherein the instructions, when executed by the hardware processor, further cause the hardware processor to:
  determine that a particular event of the list of events is scheduled to occur within a threshold time; and
  in response to determining that the particular event is scheduled to occur within the threshold time, transmit a message to a device of the user, the message indicating that the particular event is scheduled to occur.

19. The non-transitory computer-readable medium of claim 15, wherein the instructions, when executed by the hardware processor, further cause the hardware processor to:
  receive information associated with an interaction with a particular point on the timeline; and
  in response to receiving the information associated with the interaction with the particular point on the timeline, display a tooltip on the display, the tooltip comprising information associated with the event corresponding to the particular point.

20. The non-transitory computer-readable medium of claim 15, wherein the instructions, when executed by the hardware processor, further cause the hardware processor to:
  receive information associated with a selection of a second conversion option of the one or more conversion options; and
  in response to receiving the information associated with the selection of the second conversion option, display, on the second page of the graphical user interface, a graph illustrating the behavior of the policy upon conversion from the first type to the new policy type associated with the second conversion option.

* * * * *